United States Patent
Zhong et al.

(10) Patent No.: US 12,397,265 B2
(45) Date of Patent: Aug. 26, 2025

(54) METHODS FOR PREPARING CERAMIC FIBER FILTER TUBES WITH HIGH AIR PERMEABILITY

(71) Applicant: NANJING TECH UNIVERSITY, Jiangsu (CN)

(72) Inventors: Zhaoxiang Zhong, Nanjing (CN); Shiying Ni, Nanjing (CN); Dong Zou, Nanjing (CN); Yanmin Gong, Nanjing (CN); Weihong Xing, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 19/026,585

(22) Filed: Jan. 17, 2025

(65) Prior Publication Data
US 2025/0153113 A1 May 15, 2025

Related U.S. Application Data (63) Continuation-in-part of application No. PCT/CN2023/116375, filed on Aug. 31, 2023.

(30) Foreign Application Priority Data

Oct. 11, 2022 (CN) .......................... 202211240909.5

(51) Int. Cl.
*C04B 35/00* (2006.01)
*B01D 39/20* (2006.01)
(Continued)

(52) U.S. Cl.
CPC .... *B01D 67/00411* (2022.08); *B01D 39/2086* (2013.01); *B01D 71/027* (2013.01);
(Continued)

(58) Field of Classification Search
CPC ............................ C04B 28/24; C04B 38/0022
See application file for complete search history.

(56) References Cited

U.S. PATENT DOCUMENTS

| | | | |
|---|---|---|---|
| 4,376,675 A | 3/1983 | Perrotta | |
| 4,704,416 A * | 11/1987 | Eck | ........................ C08K 5/54 |
| | | | 524/45 |

(Continued)

FOREIGN PATENT DOCUMENTS

| | | |
|---|---|---|
| CA | 1057675 A | 7/1979 |
| CN | 101954246 A | 1/2011 |

(Continued)

OTHER PUBLICATIONS

CN-108440008-A (Jiang) Aug. 2018 (online machine translation), [Retrieved on Mar. 10, 2025]. Retrieved from: Espacenet (Year: 2018).*

(Continued)

*Primary Examiner* — Alison L Hindenlang
*Assistant Examiner* — Andres E. Behrens, Jr.
(74) *Attorney, Agent, or Firm* — Porus IP LLC (57) ABSTRACT

A method for preparing a ceramic fiber filter tube with high air permeability, including: using mullite short fibers as aggregates, adding glass fibers and silica sol as sintering aids, obtaining a ceramic fiber filter tube green body by using a filterer-pressing forming process, and obtaining the ceramic fiber filter tube with high air permeability by freeze-drying and heat treatment in turn. The combination of two sintering aids with different properties can effectively improve the performance of ceramic fiber filter tube prepared by a wet forming technology. At the same time, the freeze-drying treatment can block the migration path of nanoparticles in the silica sol to the surface of the ceramic fiber filter tube due to the capillary force, so that the properties of the prepared ceramic fiber filter tube are more (Continued)

uniform, providing a reference for the preparation of a ceramic fiber membrane with high flux.

5 Claims, 8 Drawing Sheets (51) Int. Cl.
| | |
|---|---|
| *B01D 67/00* | (2006.01) |
| *B01D 71/02* | (2006.01) |
| *C04B 35/624* | (2006.01) |
| *C04B 35/626* | (2006.01) |
| *C04B 35/634* | (2006.01) |
| *C04B 35/64* | (2006.01) |
| *C04B 35/82* | (2006.01) |
| *B01D 71/00* | (2006.01) |

(52) U.S. Cl.
CPC ...... *C04B 35/624* (2013.01); *C04B 35/62655* (2013.01); *C04B 35/62675* (2013.01); *C04B 35/63416* (2013.01); *C04B 35/64* (2013.01); *C04B 35/82* (2013.01); *B01D 71/00* (2013.01); *B01D 2239/10* (2013.01); *B01D 2323/082* (2022.08); *B01D 2323/12* (2013.01); *B01D 2323/24* (2013.01); *B01D 2323/52* (2022.08); *C04B 35/00* (2013.01); *C04B 2235/3418* (2013.01); *C04B 2235/5228* (2013.01); *C04B 2235/5296* (2013.01); *C04B 2235/604* (2013.01); *C04B 2235/606* (2013.01); *C04B 2235/6562* (2013.01); *C04B 2235/6565* (2013.01); *C04B 2235/6567* (2013.01)

(56) References Cited

U.S. PATENT DOCUMENTS

| | | | | |
|---|---|---|---|---|
| 4,968,467 | A | 11/1990 | Zievers | |
| 5,849,650 | A * | 12/1998 | Rorabaugh | ......... C04B 41/4537 501/84 |
| 2003/0168200 | A1 * | 9/2003 | Vandermeer | ............ C04B 35/14 164/361 |
| 2004/0161596 | A1 * | 8/2004 | Taoka | .............. B01D 46/24492 428/304.4 |
| 2007/0017196 | A1 | 1/2007 | Choi et al. | |
| 2007/0107395 | A1 | 5/2007 | Zuberi et al. | |
| 2015/0056471 | A1 * | 2/2015 | Joo | ................... C04B 35/63488 501/153 |
| 2015/0225302 | A1 | 8/2015 | Cai et al. | |
| 2015/0354099 | A1 * | 12/2015 | Ohshima | ................... D01F 9/08 428/401 |

FOREIGN PATENT DOCUMENTS

| | | | | |
|---|---|---|---|---|
| CN | 104513050 | | 4/2015 | |
| CN | 106146000 | | 11/2016 | |
| CN | 106187297 | | 12/2016 | |
| CN | 106747208 | A * | 5/2017 | ........... C04B 28/005 |
| CN | 107213680 | | 9/2017 | |
| CN | 108440008 | | 8/2018 | |
| CN | 108440008 | A * | 8/2018 | ............ B01D 29/00 |
| CN | 108610086 | | 10/2018 | |
| CN | 108610086 | A * | 10/2018 | ............ C04B 35/14 |
| CN | 110038368 | | 7/2019 | |
| CN | 110894166 | A * | 3/2020 | ............ C04B 35/10 |
| CN | 111908932 | | 11/2020 | |
| CN | 112063308 | | 12/2020 | |
| CN | 112892238 | | 6/2021 | |
| CN | 114315398 | | 4/2022 | |
| CN | 115521158 | A | 12/2022 | |
| GB | 1476481 | A | 6/1977 | |
| JP | 2001205029 | | 7/2001 | |

OTHER PUBLICATIONS

CN-108610086-A (Fei) Oct. 2018 (online machine translation), [Retrieved on Mar. 10, 2025]. Retrieved from: Espacenet (Year: 2018).*
Super-Insulated, flexible, and high resilient mullite fiber reinforced silica aerogel composites by interfacial modification with nanoscale mullite whisker https://doi.org/10.1016/j.compositesb.2021.109549 Zhehan Yi a, 2022 (Year: 2022).*
Efficient construction of tubular mullite fiber membrane filter with high gas permeance for gas/solid filtration https://doi.org/10.1016/j.seppur.2023.123258 Dong Zou, 2023 (Year: 2023).*
High gas permeability and directional channels of mulliteporous ceramics prepared by pectin-based freeze-drying method DOI: 10.1111/ijac. 14446 Liu, 2023 (Year: 2023).*
High-performance mullite fibrous ceramic filter enhanced by composite sintering aids for dust-laden gas filtration https://doi.org/10.1016/j.seppur.2022.120967 Yanmin Gong, 2022 (Year: 2022).*
Freeze-casting in synthetic porous materials: Principles, different dimensional building units and recent applications https://doi.org/10.1016/j.susmat.2024.e00830 Mi, 2024 (Year: 2024).*
Lin, Xizhu et al., Preparation and Characterization of Alumina Silicate Fiber Filters, Shandong Ceramics, 2012, 4 pages.
Liu, Mingzhao et al., Development of highly porous mullite whisker ceramic membranes for oil-in-water separation and resource utilization of coal gangue, Separation and Purification Technology, 2020, 10 pages.
Zou, Dong et al., Efficient construction of tubular mullite fiber membrane filter with high gas permeance for gas/solid filtration, Separation and Purification Technology, 2023, 9 pages.
First Office Action in Chinese Application No. 202211240909.5 mailed on Feb. 21, 2023, 16 pages.
Notification to Grant Patent Right for Invention in Chinese Application No. 202211240909.5 mailed on Jul. 27, 2023, 5 pages.
Xu, Xiaojing et al., Effect of binder types on the properties of the mullite fibrous ceramics prepared by TBA-based gel-casting method, Ceramics International, 43: 228-233, 2017.
Wang, Shuhai et al., Shaping Process of Structural Ceramic Components by Pressure Filtration, Advanced Ceramics, 66: 19-25, 1995.
Wang, Haizhe et al., Low-Temperature Production of Porous Silicon-Carbide Ceramics By the Self-Binding Method, Refractories and Industrial Ceramics, 53(3): 157-161, 2012.
International Search Report in PCT/CN2023/116375 mailed on Nov. 8, 2023, 6 pages.
Written Opinion in PCT/CN2023/116375 mailed on Nov. 8, 2023, 7 pages.

* cited by examiner

METHODS FOR PREPARING CERAMIC FIBER FILTER TUBES WITH HIGH AIR PERMEABILITY

CROSS-REFERENCE TO RELATED APPLICATIONS

This application is a continuation-in-part application of International Application No. PCT/CN2023/116375, filed on Aug. 31, 2023, which claims priority of Chinese patent Application No. 202211240909.5, filed on Oct. 11, 2022, the entire contents of each of which are incorporated herein by reference.

TECHNICAL FIELD

The present disclosure relates to the field of membrane material preparation, and in particular, to a method for preparing a ceramic fiber filter tube with high air permeability.

BACKGROUND

Ceramic fiber membrane is a class of ceramic filter materials prepared with high temperature resistant ceramic fibers such as alumina fibers, alumina fibers, mullite fibers, etc. as aggregates. The three-dimensional network-like porous structure, which is formed by mutual bridging between ceramic fibers, endows the ceramic fiber membrane with high porosity, good thermal stability, and high gas permeability, making it one of the most promising ceramic membrane materials. Traditional ceramic fiber filter tube is usually prepared by a wet vacuum extraction forming process. However, due to the suction effect of the negative pressure, it is easy to cause unevenness within the fiber porous ceramic material, which may adversely affect the permeability of the ceramic fiber membrane. Therefore, it is important how to improve the preparation process of ceramic fiber filter tube to prepare ceramic fiber filter tube with high air permeability.

Mold forming technology (including dry pressing, gel casting, and filter-pressing forming, etc.) has the features of simple operation and high efficiency, which has a wide range of application prospect in the field of ceramic fiber membrane preparation. Although the ceramic fiber filter material obtained by the dry pressing technology has an obviously improved strength, the porous fiber skeleton structure is compacted due to the high molding pressure, leading to a great loss of gas permeability. Xu et al. [Ceramics International, 2017, 43(1): 228-233] discloses using the gel casting to add the mullite fibers and sintering aids to a tert-butanol-based gel premix solution and solidify the slurry by the polymerization of organic monomers under the action of initiators, thus obtaining a high-strength green body. Wang Shuhai et al. [Advanced Ceramics, 1995(04): 19-25] introduces the principle of the filter-pressing forming process and the effects of slurry system and process parameters on the properties of the finished products, pointing out that the agglomeration of solid-phase particles decreases under the influence of pressure and frictional resistance, which increases the homogeneity of the slurry; the solidified layer formed by slurries with a high dispersion forms slowly due to the low permeability coefficient, which may cause density gradient, leading to poor overall uniformity; and high forming pressure may obtain more uniform ceramic finished products, however, too high pressure tends to cause cracking during demolding and drying, and a more desirable pressure range is 1-4 MPa.

Liquid-phase sintering aid is characterized by a small particle size and good dispersion, which can be uniformly wrapped on surfaces and intersections of aggregates to help promote the low-temperature sintering process, and sols and ceramic precursor solutions can be used to assist the porous ceramic sintering process. Hai et al. [Refractories and Industrial Ceramics, 2012, 53: 157-161] discloses using polycarbosilane as the precursor solution; after drying, obtaining pure silicon carbide porous ceramics by sintering at 1000° C. without adding any sintering aid, with an average porosity of 33.4%, a fracture strength of about 16 MPa, and an average pore diameter of 2.275 μm. The necking connection strength formed by a small count of inorganic sol at the fibers junctions is relatively low, which is not conducive to the long-term use of ceramic fiber membrane. However, low-melting-point solid sintering aids can effectively enhance the mechanical properties of porous materials. Xu et al [Ceramics International, 2017, 43(1): 228-233] investigates the effects of different solid sintering aids (silicon powder, silica powder, and borosilicate mixtures) on the mechanical properties of the prepared fibers porous ceramic materials. The results show that the porous ceramic fibers materials, which is prepared under sintering at 1500° C. with borosilicate mixtures as the sintering aid, have the highest compressive strength of about 2.08 MPa.

SUMMARY

To overcome the defects of the prior art, the present disclosure proposes a method for preparing a ceramic fiber filter tube by replacing common liquid sintering aids with a combination of two solid and liquid sintering aids of different properties, to solve the problem of the weak neck connection at the fiber connection point. At the same time, the green body is processed by freeze-drying technology, which effectively improves the homogeneity of the ceramic fibers tube, so as to prepare ceramic fiber filter tube with high air permeability.

One or more embodiments of the present disclosure provide a method for preparing a ceramic fiber filter tube with high air permeability. The method includes the following operations: operation A, mixing silica sol with water to obtain a mixed solution, and adding mullite short fibers and glass fibers into the mixed solution, wherein a mass ratio of the silica sol, mullite short fibers, and glass fibers is (30-45):(1.5-9):1, adding an organic forming aid into the mixed solution and stirring, and obtaining a ceramic fiber filter tube green body by a filter-pressing forming process, wherein an aspect ratio of the mullite short fibers is within a range of (50:1)-(200:1); and operation B, placing a demolded green body in a refrigerator for freezing for 12 h-24 h, drying the frozen green body at a temperature of −60° C. to −20° C. for 12 h-24 h, and obtaining the ceramic fiber filter tube by a calcination process.

In some embodiments, a mass fraction of the silica sol in the operation A is within a range of 20 wt %-40 wt %, and a volume ratio of the silica sol to the water is 1: (1.5-9).

In some embodiments, the organic forming aid in the operation A is a polyvinyl alcohol (PVA) solution at a concentration of 8 wt %-12 wt %, an addition amount of the PVA solution is 60%-80% of a total mass of the mullite short fibers and glass fibers.

In some embodiments, a time of the stirring is within a range of 3 min-10 min.

In some embodiments, a pressure in the filter-pressing forming process is within a range of 2 MPa-4 MPa.

In some embodiments, the calcination process includes calcining the frozen green body at a temperature of 800° C.-1400° C., and holding for 1 h-3 h, wherein a heating rate and a cooling rate are controlled at 0.5° C./min-3° C./min.

The ceramic fiber filter tube prepared in one or more embodiments of the present disclosure has an average pore diameter of 34.1-35.2 μm, a porosity of 74-75.2%, a gas permeability of 642-787 $m^3 \cdot m^{-2} \cdot h^{-1} \cdot kPa^{-1}$, and a flexural strength of 1.86-2.88 MPa.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

The terminology used herein is for the purposes of describing particular examples and embodiments only and is not intended to be limiting. As used herein, the singular forms "a," "an," and "the" may be intended to include the plural forms as well, unless the context clearly indicates otherwise.

The ceramic fiber filter tube is a tubular filter material made of ceramic fibers, which may be used for filtering gas or liquid. In order to improve the filtration efficiency and filtration capacity of the ceramic fiber filter tube and to ensure that the ceramic fiber filter tube doesn't break during use, it is necessary to ensure that the gas permeability and flexural strength of the ceramic fiber filter tube. Traditional ceramic fiber filter tube often struggles to balance gas permeability and flexural strength, resulting in poor lifespan and filtration capability.

In view of the foregoing, one or more embodiments of the present disclosure provide a method for preparing a ceramic fiber filter tube with high air permeability, which is capable of preparing a ceramic fiber filter tube with high air permeability, good homogeneity, and good flexural strength.

Figure 7:
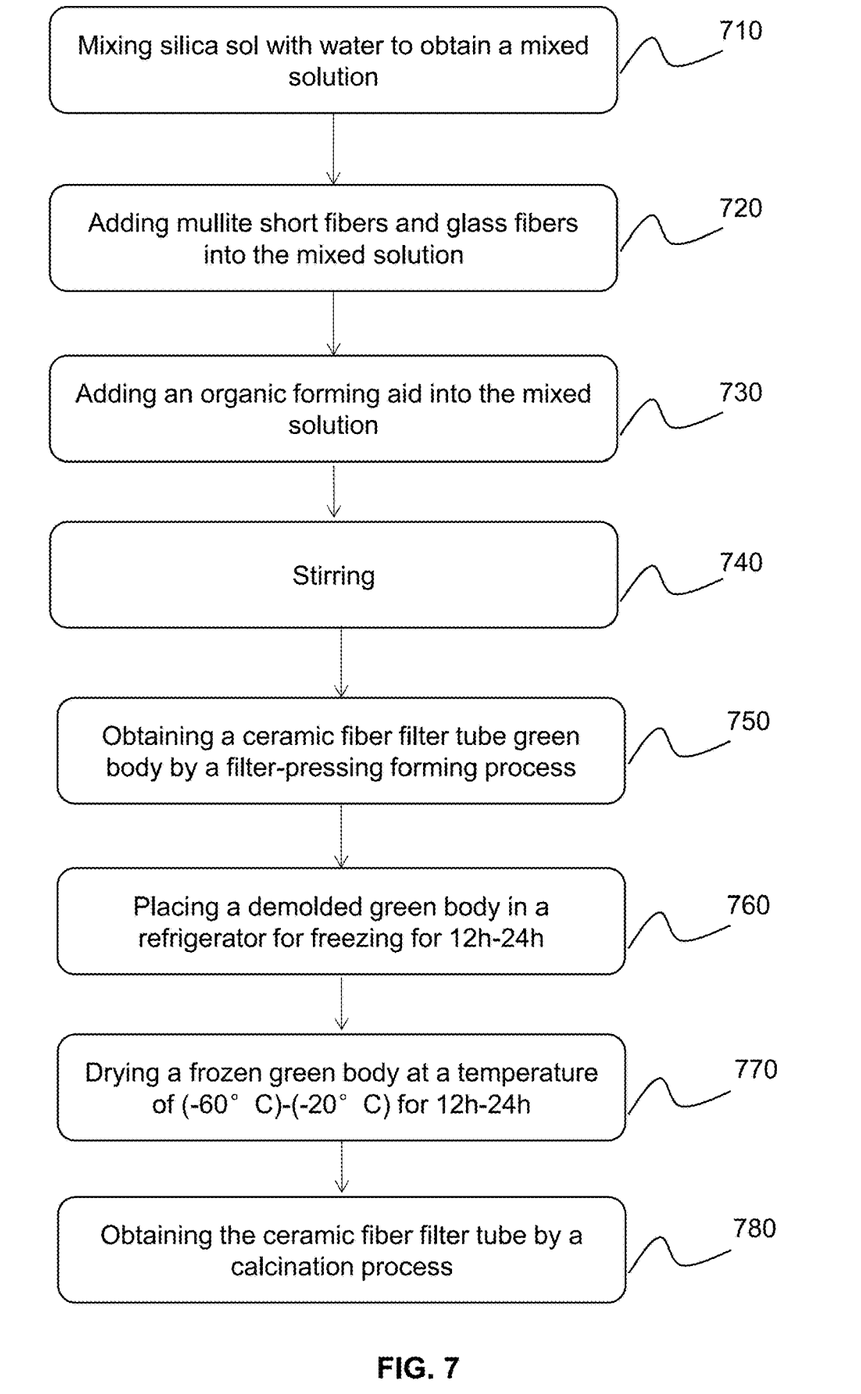
FIG. 7 is an exemplary flowchart of the method for preparing a ceramic fiber filter tube with high air permeability as shown in some embodiments of the present disclosure.

In some embodiments, as shown in FIG. 7, the method for preparing a ceramic fiber filter tube with high air permeability includes operation A and operation B.

Operation A, mixing silica sol with water to obtain a mixed solution, and adding mullite short fibers and glass fibers into the mixed solution; wherein a mass ratio of the silica sol, the mullite short fibers, and the glass fibers is (30-45):(1.5-9):1, adding an organic forming aid into the mixed solution and stirring, and obtaining a ceramic fiber filter tube green body by a filter-pressing forming process; wherein an aspect ratio of the mullite short fibers is within a range of (50:1)-(200:1).

Silica sol is a colloidal aqueous solution containing silica particles, which may be used as a sintering aid for the ceramic fiber filter tube green body.

In some embodiments, a mass fraction of the silica sol in the operation A is within a range of 20 wt %-40 wt %, and a volume ratio of the silica sol to the water is 1: (1.5-9).

The mass fraction of the silica sol is a mass fraction of silica particles in a colloidal aqueous solution containing silica particles. For example, when the mass fraction of the silica sol is 20 wt %, it means that 100 g of the silica sol contains 20 g of silica particles.

In some embodiments, the mass fraction of the silica sol in the operation A may also be within a range of 20 wt %-35 wt %, a range of 20 wt %-30 wt %, a range of 25 wt %-40 wt %, a range of 30 wt %-40 wt %, a range of 35 wt %-40 wt %, or the like.

In some embodiments, the mass fraction of the silica sol may also be at least one of 20 wt %, 25 wt %, 30 wt %, 35 wt %, 40 wt %.

In some embodiments, the volume ratio of the silica sol to the water may also be at least one of 1: (1-9), 1: (1-8), 1: (1-7), 1: (1.5-8), 1: (2-9), 1: (2-8), 1: (2.33-9), 1: (2-7), 1: (2.33-8), or the like.

In some embodiments, the volume ratio of the silica sol to the water may also be at least one of 1:1.5, 1:2, 1:2.33, 1:2.5, 1:3, 1:4, 1:5, 1:6, 1:7, 1:8, 1:9, or the like.

In some embodiments of the present disclosure, by adjusting the mass fraction of the silica sol and the volume ratio of the silica sol to the water, it is possible to regulate the pore structure and the porosity of the ceramic fiber filter tube, so as to significantly improve the permeability and the filtration efficiency of the filter tube, while ensuring that its mechanical property meets the use requirements.

Mullite is a ceramic material consisting of silica and alumina trioxide, and mullite short fibers are rod-shaped mullite fibers, which may be used as raw materials for the preparation of ceramic fiber filter tube.

In some embodiments, agglomeration of the mullite short fibers may occur, resulting in uneven distribution of fibers in the ultimately produced ceramic fiber filter tube. The mullite short fibers with good dispersion are obtained by first placing the agglomerated mullite short fibers in water, stirring to disperse, filtering out the excess water, and then drying in an oven.

In some embodiments, the aspect ratio of the mullite short fibers may be (50:1)-(200:1).

In some embodiments, the aspect ratio of the mullite short fibers may also be at least one of (50:1)-(150:1), (50:1)-(100:1), (100:1)-(200:1), (150:1)-(200:1), or the like.

In some embodiments, the aspect ratio of the mullite short fibers may also be at least one of 50:1, 100:1, 150:1, 200:1, or the like.

Glass fibers are fibrous glass materials that may be used as a raw material for the preparation of ceramic fiber filter tube. In some embodiments, the type of glass fibers includes, but is not limited to, one or more of borosilicate glass, quartz glass, lead glass, potassium glass.

In some embodiments, the aspect ratio of the glass fibers may be the same as or different from that of the mullite short fibers, and the aspect ratio and type of the glass fibers may be determined based on actual application scenarios and needs.

In some embodiments, the mass ratio of silica sol, mullite short fibers, and glass fibers is (30-45):(1.5-9):1.

In some embodiments, the mass ratio of silica sol, mullite short fibers, and glass fibers may also be at least one of (30-40):(1.5-4):1, (35-45):(2.33-9):1, (40-45):(4-9):1, (30-35):(1.5-2.33):1, (35-40):(2.33-4):1, or the like.

In some embodiments, the mass ratio of the silica sol, the mullite short fibers, and the glass fibers may also be at least one of 30:1.5:1, 35:2.33:1, 40:4:1, 45:9:1, 32:2:1, 38:3:1, 42:6:1, 44:8:1, 35:4:1, or the like.

Organic forming aid is an organic additive that aids in the processing and forming of ceramic fiber filter tube. In some embodiments, the organic forming aid may include, but is not limited to, one or more of sodium carboxymethyl cellulose (CMC), polyethylene glycol (PEG), polyacrylic acid (PAA), polyvinyl pyrrolidone (PVP), or the like. The specific type and mass fraction of the organic forming aid may be determined based on the actual application scenarios and needs.

In some embodiments, the organic forming aid may be a pure substance or be formulated as a solution. For example, an aqueous solution, an ethanol solution, or the like. The mass fraction of the organic forming aid solution may be determined according to the actual application scenarios and needs.

In some embodiments, the organic forming aid in the operation A is a PVA solution at a concentration of 8 wt %-12 wt %, an addition amount of the PVA solution is 60%-80% of the total mass of the mullite short fibers and glass fibers.

PVA solution is an aqueous solution of polyvinyl alcohol. The degree of polymerization and alcoholysis of polyvinyl alcohol may be determined according to the actual application scenarios and needs.

In some embodiments, the concentration of polyvinyl alcohol in the PVA solution may also be at least one of 8 wt %-11 wt %, 8 wt %-10 wt %, 9 wt %-11 wt %, 9 wt %-10 wt %, 10 wt %-11 wt %, or the like.

In some embodiments, the concentration of the polyvinyl alcohol in the PVA solution may also be at least one of 8 wt %, 9 wt %, 10 wt %, 11 wt %, 12 wt %, or the like.

In some embodiments, the addition amount of the PVA solution is 60%-80% of the total mass of the mullite short fibers and glass fibers.

In some embodiments, the addition amount of the PVA solution may also be at least one of 60%-75%, 60%-70%, 60%-65%, 65%-75%, 65%-70%, or the like, of the total mass of the mullite short fibers and glass fibers.

In some embodiments, the addition amount of the PVA solution may be at least one of 60%, 65%, 70%, 75%, 80%, or the like, of the total mass of the mullite short fibers and glass fibers.

The use of PVA solution as the organic forming aid can effectively improve the strength and toughness of the green body and reduce the risk of cracking during the forming process; by controlling the concentration and addition amount of PVA solution, it can help to improve the rheological property of the slurry and enhance the success of the filter-pressing forming.

Stirring refers to the operation of adequately mixing the silica sol, mullite short fibers, and glass fibers. In some embodiments, stirring includes mechanical stirring, ultrasonic stirring, magnetic stirring, or the like.

In some embodiments, a time of the stirring is within a range of 3-10 min.

Raw materials such as silica sol, mullite short fibers, and glass fibers are mixed and stirred to form a slurry, which is also referred to as a film-making solution.

In some embodiments, the time of stirring the film-making solution may also be at least one of 3-8 min, 4-9 min, 5-9 min, 6-9 min, 3-7 min, 4-8 min, or the like.

In some embodiments, the time of stirring the film-making solution may also be at least one of 3 min, 4 min, 5 min, 6 min, 7 min, 8 min, 9 min, 10 min, or the like.

According to some embodiments of the present disclosure, by determining the time of stirring the film-making solution, it is possible to ensure that the plurality of raw materials contained in the film-making solution are sufficiently mixed homogeneously, which can help to enhance the structural consistency and the stability of the performance of the ceramic fiber filter tube green body obtained by filter-pressing forming.

The filter-pressing forming process is a manufacturing manner to process the film-making solution into ceramic fiber filter tube green body.

Figure 8:
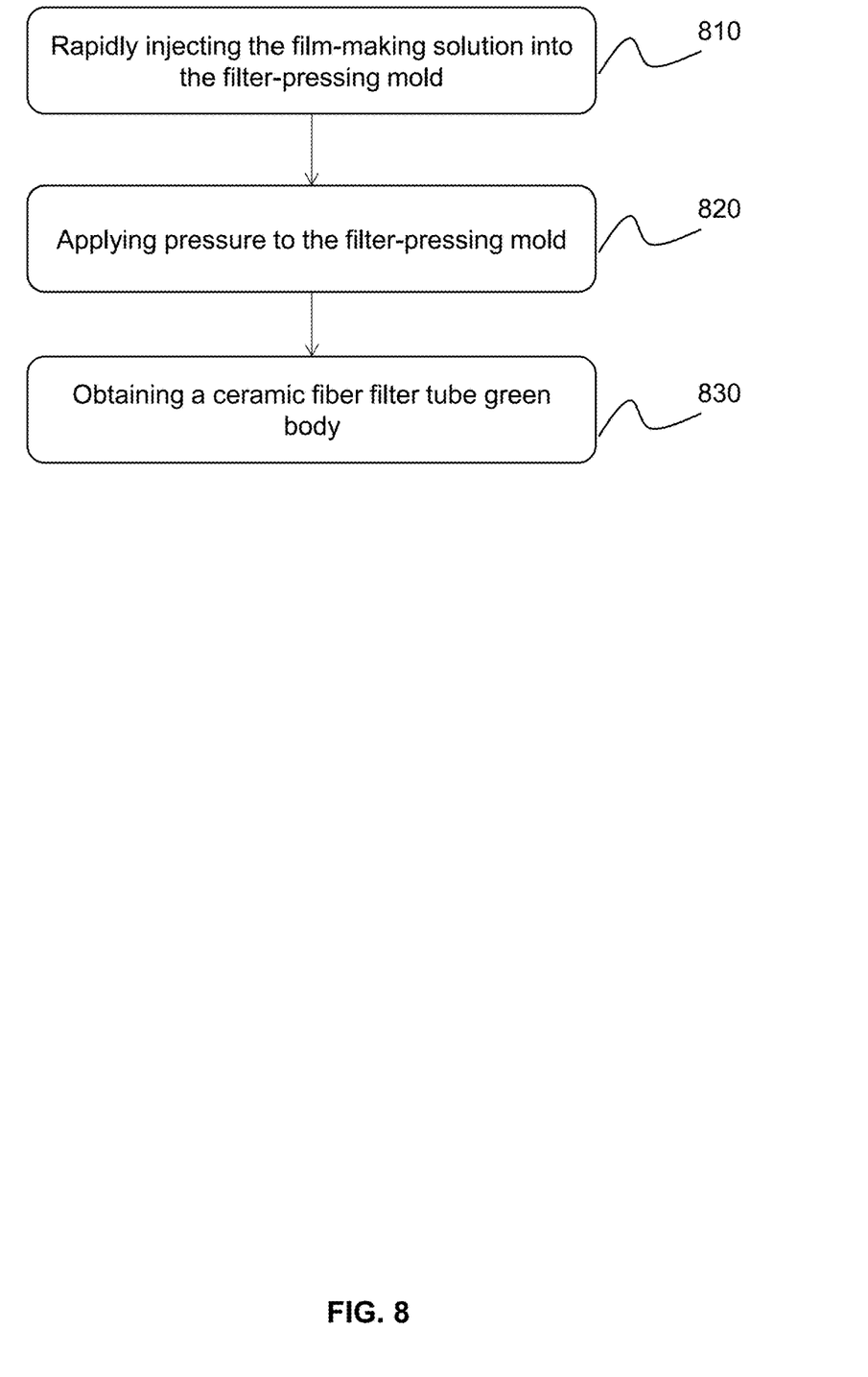
FIG. 8 is an exemplary flowchart of the filter-pressing forming process as shown in some embodiments of the present disclosure.

In some embodiments, as shown in FIG. 8, the filter-pressing forming process includes: rapidly injecting the film-making solution into the filter-pressing mold, and upon completion of the injection, causing water in the film-making solution to be filtered out from the filter-pressing mold by applying pressure, and obtaining a ceramic fiber filter tube green body. The pressure and pressure duration of the filter-pressing forming may be determined according to the actual application scenarios and requirements.

In some embodiments, the pressure in the filter-pressing forming process is within a range of 2-4 MPa.

In some embodiments, the pressure in the filter-pressing forming process may also be at least one of 2-3.5 MPa, 2.5-4 MPa, 2.5-3.5 MPa, 3-4 MPa, or the like.

In some embodiments, the pressure in the filter-pressing forming process may also be at least one of 2 MPa, 2.5 MPa, 3 MPa, 3.5 MPa, 4 MPa, or the like.

According to some embodiments of the present disclosure, by determining a range of pressure in the filter-pressing forming process, it can ensure that the ceramic fiber filter tube green body obtained by the filter-pressing forming process has a suitable density, avoiding fibers damages and forming defects due to too high pressure, and problems such as structural looseness and poor structural strength brought about by too little pressure.

Operation B, placing a demolded green body in a refrigerator for freezing for 12 h-24 h, drying a frozen green body at a temperature of (−60° C.)–(−20° C.) for 12 h-24 h, and obtaining the ceramic fiber filter tube by a calcination process.

The refrigerator is a cooling device configured to cool down ceramic fiber filter tube green body after demolding. In some embodiments, the refrigerator may also be integrated into a drying apparatus such as a vacuum lyophilizer with pre-cooling function, or the like. The freezing temperature of the refrigerator may be determined based on actual application scenarios and needs.

In some embodiments, the freezing duration of the demolded green body placed in the refrigerator may also be at least one of 12-22 h, 14-24 h, 14-22 h, 16-24 h, 16-22 h, 18-24 h, or the like.

In some embodiments, the freezing duration of the demolded green body placed in the refrigerator may also be at least one of 12 h, 14 h, 16 h, 18 h, 20 h, 22 h, 24 h, or the like.

Drying is the step of removing residual solvents from the green body. Drying equipment may include, but is not limited to, a vacuum lyophilizer, an infrared dryer, a cold air freeze dryer, or the like.

In some embodiments, the drying temperature of the green body may be at least one of −60° C. to −25° C., −60° C. to −30° C., −60° C. to −35° C., −55° C. to −20° C., −55° C. to −25° C., −55° C. to −30° C., −50° C. to −20° C., −50° C. to −25° C., −50° C. to −30° C., or the like.

In some embodiments, the drying temperature of the green body may be at least one of −60° C., −55° C., −50° C., −45° C., −40° C., −35° C., −30° C., −25° C., −20° C., or the like.

In some embodiments, the drying duration of the green body may also be at least one of 12-22 h, 14-24 h, 14-22 h, 16-24 h, 16-22 h, 18-24 h, or the like.

In some embodiments, the drying duration of the green body may also be at least one of 12 h, 14 h, 16 h, 18 h, 20 h, 22 h, 24 h, or the like.

Calcination is a thermal processing step for preparing ceramic fiber filter tube. Calcination equipment includes, but is not limited to, an atmosphere furnace, a kiln, or the like.

In some embodiments, the calcination may be performed under different atmosphere. For example, a rare gas atmosphere, a nitrogen atmosphere, an air atmosphere, or the like.

In some embodiments, the calcination temperature, the heating rate, the holding time, and the cooling rate of the calcination process may be determined according to the actual application scenarios and needs.

In some embodiments, the calcination process is to calcine the green body at 800-1400° C., with the heating rate and cooling rate controlled at 0.5-3° C./min, and a holding time of 1-3 h.

In some embodiments, the calcination temperature of the calcination process may further be at least one of 800-1000° C., 800-1100° C., 900-1100° C., 900-1200° C., 1000-1200° C., 1000-1300° C., 1100-1300° C., 1100-1400° C., 1200-1400° C., or the like.

In some embodiments, the calcination temperature of the calcination process may further be at least one of 800° C., 900° C., 1000° C., 1100° C., 1200° C., 1300° C., 1400° C., or the like.

In some embodiments, the heating rate and cooling rate of the calcination process may also be at least one of 0.5-1.5° C./min, 1-2° C./min, 1.5-2.5° C./min, 2-3° C./min, or the like.

In some embodiments, the heating rate and the cooling rate of the calcination process may also be at least one of 0.5° C./min, 1° C./min, 1.5° C./min, 2° C./min, 2.5° C./min, 3° C./min, etc.

In some embodiments, the holding time of the calcination process may also be at least one of 1-2 h, 1.5-2.5 h, 2-3 h, or the like.

In some embodiments, the holding time of the calcination process may also be at least one of 1 h, 1.5 h, 2 h, 2.5 h, 3 h, or the like.

In some embodiments of the present disclosure, by determining a suitable calcination temperature, heating rate, holding time, and cooling rate during the calcination process, it is possible to reduce the sintering energy consumption of preparing the ceramic fiber filter tube, while ensuring the sintering success rate of the green body, which helps to ensure the mechanical strength and chemical stability of the ceramic fiber filter tube.

The following is a further description of a method for preparing a ceramic fiber filter tube with high air permeability provided by some embodiments of the present disclosure using some examples and comparative examples.

Example 1

The agglomerated mullite short fibers were placed into water for stirring and dispersing, and then the excess water was filtered out and the filtered mullite short fibers were placed into the oven at 120° C. for drying, to obtain the well-dispersed short fibers (an aspect ratio of 50:1). Then, 40 wt % silica sol and water were mixed and stirred thoroughly to obtain a mixed solution, and a volume ratio of silica sol to water was 1:9. Mullite short fibers and glass fibers were then added to the mixed solution, and the mass ratio of silica sol, mullite short fibers, and glass fibers was 30:1.5:1. 12 wt % PVA solution was added to the mixed solution and stirred for 10 min to obtain a stirred mixed solution, and the addition amount of the PVA solution is 60% of the total mass of the mullite short fibers and glass fibers. The stirred mixed solution was then quickly injected into the filter-pressing mold, and pressure was slowly applied to 2 MPa. After filtering out the water, the ceramic fiber filter tube green body was obtained. The demolded green body was placed in a refrigerator for freezing for 24 h and then dried in a vacuum lyophilizer of −60° C. for 24 h, and then heated to 800° C. in an air atmosphere at a rate of 0.5° C./min and held for 3 h to obtain the ceramic fiber filter tube with an average pore diameter of 34.1 μm, a porosity of about 74%, a gas permeability of 642 $m^3 \cdot m^{-2} \cdot h^{-1} \cdot kPa^{-1}$, and an average flexural strength of about 1.86 MPa.

Example 2

The agglomerated mullite short fibers were placed into water for stirring and dispersing, and then the excess water was filtered out and the filtered mullite short fibers were placed into the oven at 120° C. for drying, to obtain the well-dispersed short fibers (an aspect ratio of 200:1). Then, 35 wt % silica sol and water were mixed and stirred thoroughly to obtain a mixed solution, and a volume ratio of silica sol to water was 1:4. Mullite short fibers and glass fibers were then added to the mixed solution, and a mass ratio of silica sol, mullite short fibers, and glass fibers of 35:2.33:1. 10 wt % PVA solution was added to the mixed solution and stirred for 8 min to obtain a stirred mixed solution, and an addition amount of the PVA solution is 70% of the total mass of the mullite short fibers and glass fibers. The stirred mixed solution was then quickly injected into the filter-pressing mold, and pressure was slowly applied to 3 MPa. After filtering out the water, the ceramic fiber filter tube green body was obtained. The demolded green body was placed in a refrigerator for freezing for 12 h and then dried in a vacuum lyophilizer of −50° C. for 24 h, and then heated to 1000° C. in an air atmosphere at a rate of 2° C./min and held for 2 h, to obtain the ceramic fiber filter tube with an average pore diameter of 34.6 μm, a porosity of about 74.6%, a gas permeability of 680 $m^3 \cdot m^{-2} \cdot h^{-1} \cdot kPa^{-1}$, and an average flexural strength of about 2.34 MPa.

Example 3

The agglomerated mullite short fibers were placed into water for stirring and dispersing, and then the excess water was filtered out and the filtered mullite short fibers were placed into the oven at 120° C. for drying, to obtain the well-dispersed short fibers (an aspect ratio of 100:1). Then, 30 wt % silica sol was mixed with water and stirred thoroughly to obtain a mixed solution, and the volume ratio of silica sol to water was 1:2.33. Mullite short fibers and glass fibers were then added to the mixed solution, and a mass ratio of silica sol, mullite short fibers, and glass fibers of 40:4:1. 10 wt % PVA solution was added to the mixed solution and stirred for 5 m to obtain a stirred mixed solution, and an addition amount of the PVA solution is 75% of the total mass of the mullite short fibers and glass fibers. The stirred mixed solution was then quickly injected into the filter-pressing mold, and pressure was slowly applied to 3 MPa. After filtering out the water, the ceramic fiber filter tube green body was obtained. The demolded green body was placed in a refrigerator for freezing for 24 h and then dried in a vacuum lyophilizer of −40° C. for 12 h, and heated to 1200° C. in an air atmosphere at a rate of 2° C./min and held for 2 h, to obtain the ceramic fiber filter tube with an average pore diameter of 35.2 μm, a porosity of about 75%, a gas permeability of 787 $m^3 \cdot m^{-2} \cdot h^{-1} \cdot kPa^{-1}$, and an average flexural strength of about 2.68 MPa.

TABLE 1

Comparison of the performances of ceramic fiber filter tube prepared in example 3 with silicon carbide particle ceramic tube in the literature

|  | Silicon carbide particle ceramic tube | Ceramic fiber filter tube |
| --- | --- | --- |
| Outer diameter × Wall thickness (mm) | 60 × 10 | 39 × 12 |
| Flexural strength (MPa) | 22 | 2.68 |
| Porosity (%) | 39 | 75 |
| Body phase density (g · cm$^{-3}$) | 1.8 | 0.67 |
| Average pore diameter (μm) | ~33 | ~35 |
| Gas permeability ($m^3 \cdot m^{-2} \cdot h^{-1} \cdot kPa^{-1}$) | 117 | 787 |

Table 1 is a performance comparison table between the ceramic fiber filter tube prepared in this example (example 3) and the silicon carbide particle ceramic tube in the literature. From Table 1, it is easy to see that the ceramic fiber filter tube prepared by example 3, compared with the silicon carbide particle ceramic tube in the literature, has the obvious advantages of high air permeability, a smaller density and a larger gas permeability and porosity, and the ceramic fiber filter tube with high air permeability is successfully produced.

Figure 1:
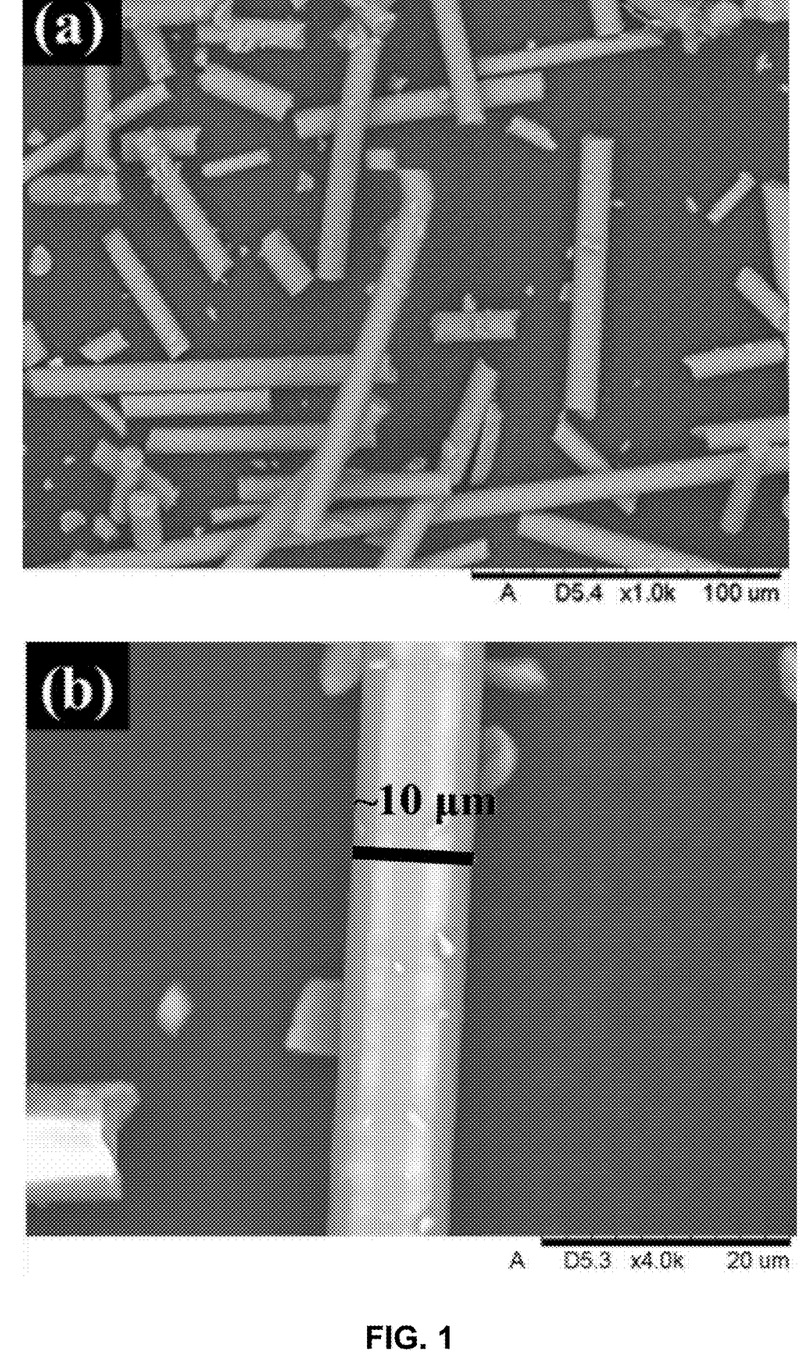
FIG. 1 is an SEM image illustrating a microstructure of the glass fibers according to example 3 of the present disclosure.

FIG. 1 is an SEM image illustrating the microstructure of the glass fibers according to example 3 of the present disclosure, with a diameter of the glass fiber of about 10 μm and an average length of the glass fiber of about 60 μm.

Figure 2:
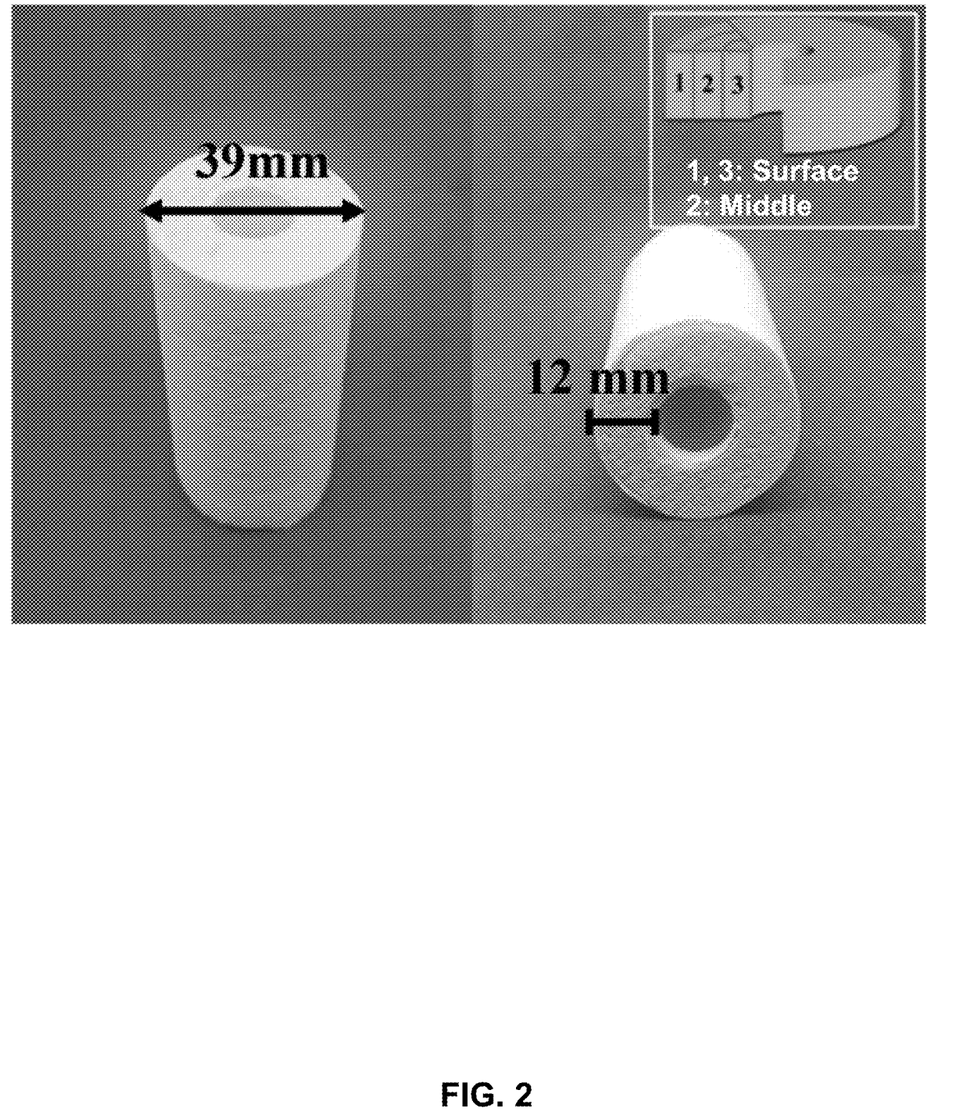
FIG. 2 is a macroscopic morphology of the ceramic fiber filter tube prepared according to example 3 of the present disclosure.

FIG. 2 is a macroscopic morphology of the ceramic fiber filter tube prepared according to example 3 pf the present disclosure, with a length of the ceramic fiber filter tube of 80 mm, an outer diameter of the ceramic fiber filter tube of 39 mm, and a wall thickness of the ceramic fiber filter tube of 12 mm.

Figure 3:
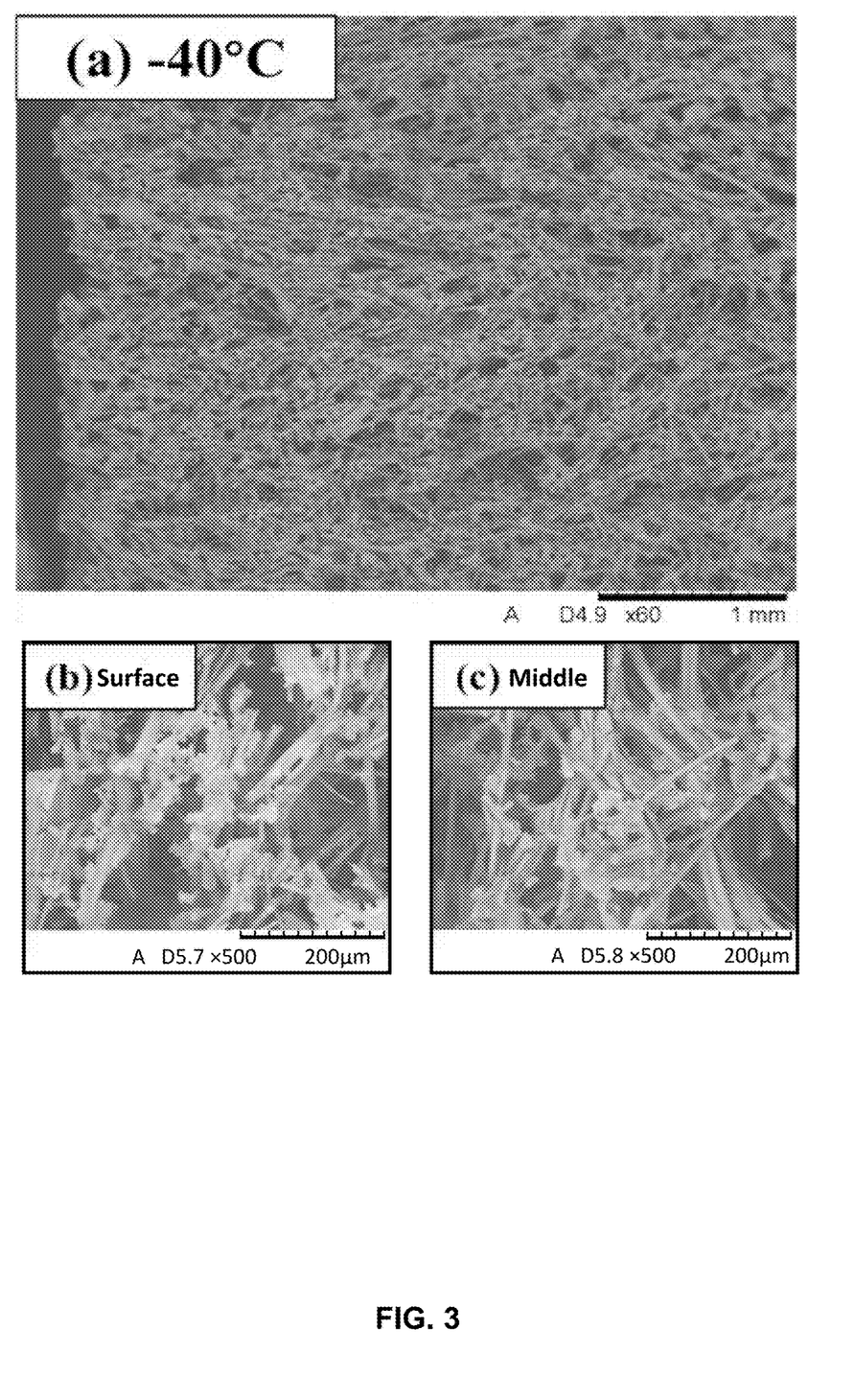
FIG. 3 is an SEM image illustrating a cross-sectional morphology, an outer surface morphology, and a middle localized morphology of the ceramic fiber filter tube prepared according to example 3 of the present disclosure.

FIG. 3 is an SEM image illustrating a cross-sectional morphology, an outer surface morphology, and a middle localized morphology of the ceramic fiber filter tube prepared according to example 3 of the present disclosure, with a uniform distribution of sintering aid in the ceramic fiber filter tube.

Figure 4:
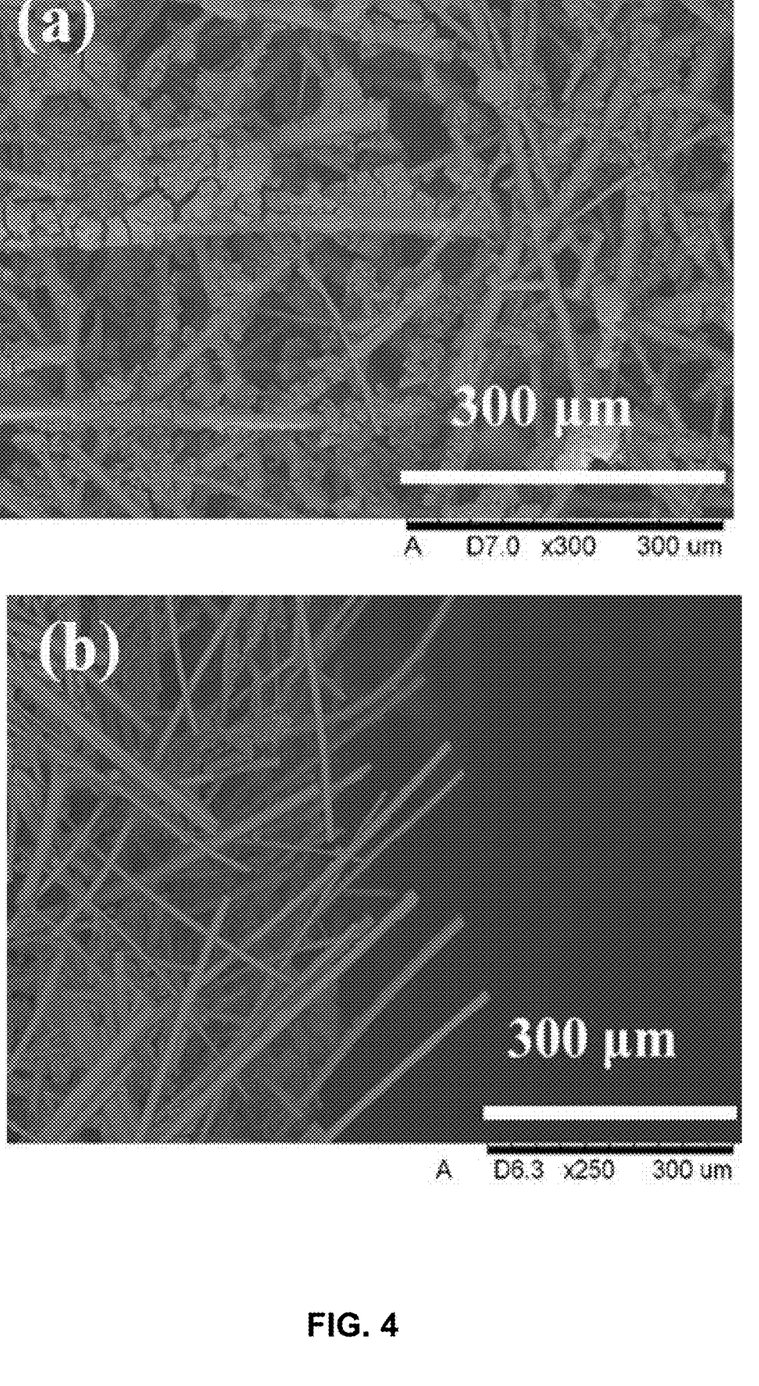
FIG. 4 is an SEM image illustrating a surface morphology and a cross-sectional morphology of the fractured ceramic fiber filter tube prepared according to example 3 of the present disclosure.

FIG. 4 is an SEM image illustrating a surface morphology and a cross-sectional morphology of the fractured ceramic fiber filter tube prepared according to example 3 of the present disclosure. A large count of fibers extend to the outside of the fracture surface, in combination with the uniform dispersion of the sintering aid within the ceramic fiber material, demonstrating that the bridging mechanism of the fibers plays a role in the fracture process.

Figure 5:
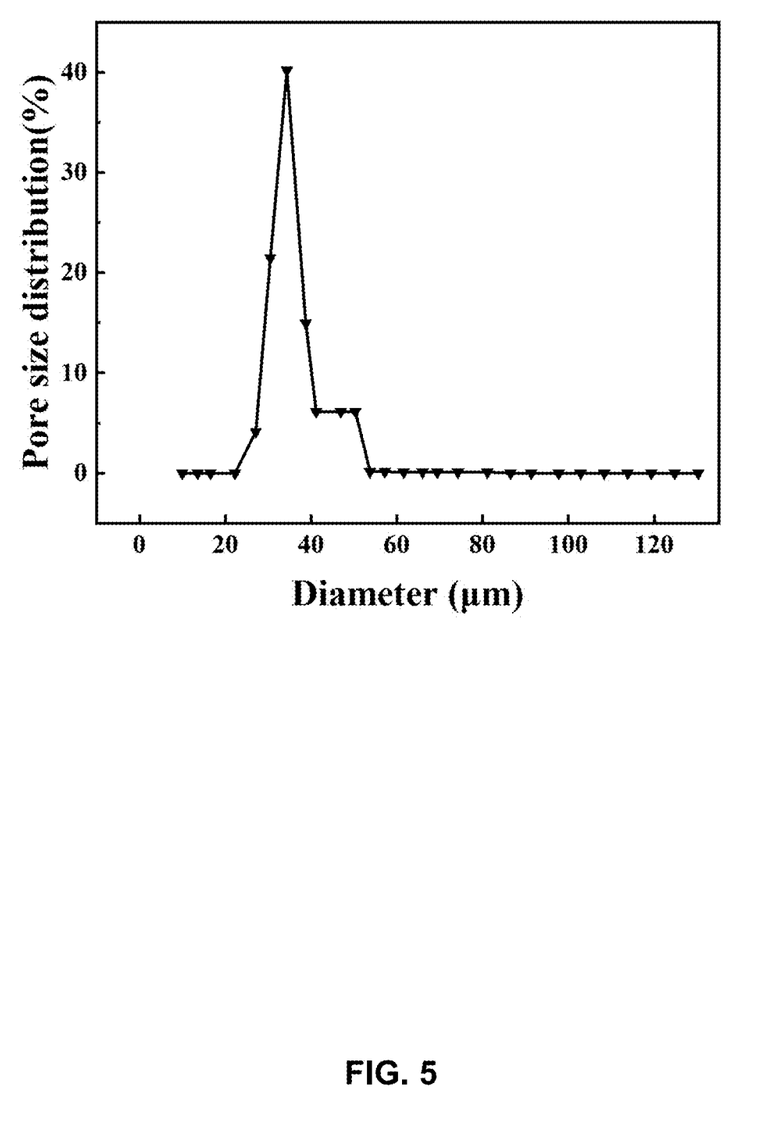
FIG. 5 is a graph illustrating a pore diameter distribution of the ceramic fiber filter tube prepared according to example 3 of the present disclosure.

FIG. 5 is a graph illustrating the pore diameter distribution of the ceramic fiber filter tube prepared according to example 3 of the present disclosure, with a concentrated pore diameter distribution and an average pore diameter of about 35.2 μm.

Figure 6:
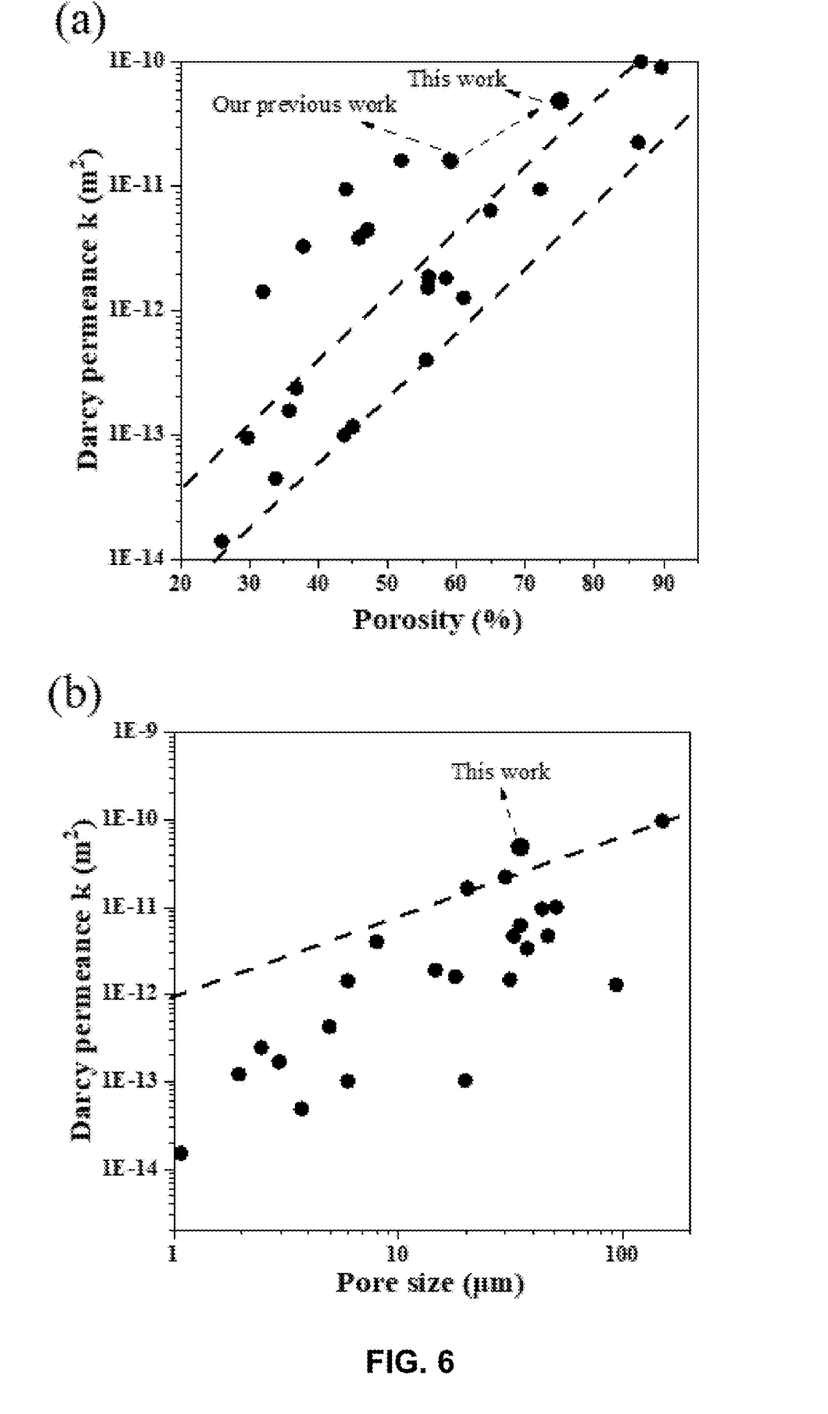
FIG. 6 is a comparison chart illustrating a relationship between Darcy permeability, porosity, and pore size for the ceramic fiber filter tube prepared according to example 3 of the present disclosure and ceramic fiber membrane prepared by other research efforts.

FIG. 6 is a comparison chart illustrating the relationship between Darcy permeability, porosity, and pore diameter of the ceramic fiber filter tube prepared in this example 3 and ceramic fiber membrane prepared by other research efforts, which shows that the permeability of the ceramic fiber filter tube prepared in this example 3 is better than average.

Example 4

The agglomerated mullite short fibers were placed into water for stirring and dispersing, and then the excess water was filtered out and the filtered mullite short fibers were placed into the oven at 120° C. for drying, to obtain the well-dispersed short fibers (an aspect ratio of 150:1). Then, 20 wt % silica sol was mixed with water and stirred thoroughly to obtain a mixed solution, and a volume ratio silica sol to water was 1:1.5. Mullite short fibers and glass fibers were then added to the mixed solution, and a mass ratio of silica sol, mullite short fibers, and glass fibers was 45:9:1. 8 wt % PVA solution was added to the mixed solution and stirred for 3 min to obtain a stirred mixed solution, and an addition amount of the PVA solution was 80% of the total mass of the mullite short fibers and glass fibers. The stirred mixed solution was quickly injected into filter-pressing mold, and pressure was slowly applied to 4 MPa. After filtering out the water, the ceramic fiber filter tube green body was obtained. The demolded green body was placed in the refrigerator for freezing for 12 h, and then dried in a vacuum lyophilizer of −20° C. for 24 h, and finally heated to 1400° C. in an air atmosphere at a rate of 3° C./min and held for 1 h, to obtain the ceramic fiber filter tube with an average pore diameter of 34.8 μm, a porosity of about 75.2%, a gas permeability of 740 $m^3 \cdot m^{-2} \cdot h^{-1} \cdot kPa^{-1}$, and an average flexural strength of 2.88 MPa.

Comparative Example 1

Firstly, the mullite short fibers were placed in water for stirring and dispersion, and then the excess water was filtered out and the filtered mullite short fibers were placed into an oven at 120° C. for drying to obtain well-dispersed short fibers (an aspect ratio of 100:1). Then, 30 wt % silica sol was mixed with water and stirred thoroughly to obtain a mixed solution, and a volume ratio of silica sol to water was 1:2.33. Mullite short fibers and glass fibers were then added to the mixed solution, and a mass ratio of silica sol, mullite short fibers, and glass fibers was 40:4:1. 10 wt % PVA solution was added to the mixed solution and stirred for 5 min to obtain a stirred mixed solution, and an addition amount of the PVA solution was 75% of the total mass of the mullite short fibers and glass fibers. The stirred mixed solution was quickly injected into the filter-pressing mold, and pressure was slowly applied to 3 MPa. After filtering out the water, the ceramic fiber filter tube green body was obtained. The demolded green body was dried at room temperature (25° C.) for 12 h, and then heated to 1200° C. in an air atmosphere at a rate of 2° C./min and held for 2, to obtain the ceramic fiber filter tube with an average pore diameter of 33.9 μm, a porosity of about 74.2%, a gas permeability of 588 $m^3 \cdot m^{-2} \cdot h^{-1} \cdot kPa^{-1}$, and an average flexural strength of about 1.48 MPa.

The steps for preparing the ceramic fiber filter tube in comparative example 1 are similar to those of example 3, with the difference being the drying step. The demolded green body in comparative example 1 was dried at 25° C. for 12 h. The demolded green body in example 3 was placed in a refrigerator for freezing for 24 h, and then was dried in a vacuum lyophilizer of −40° C. for 12 h.

TABLE 2

Comparison of the performances of the ceramic fiber filter tubes prepared in example 3 and comparative example 1

|  | Ceramic fiber filter tube prepared in example 3 | Ceramic fiber filter tube prepared in comparative example 1 |
| --- | --- | --- |
| Average pore diameter (μm) | 35.2 | 33.9 |
| Porosity (%) | 75 | 74.2 |
| Gas permeability ($m^3 \cdot m^{-2} \cdot h^{-1} \cdot kPa^{-1}$) | 787 | 588 |
| Average flexural strength (MPa) | 2.68 | 1.48 |

From Table 2, it is easy to see that the average pore diameter and the porosity of the ceramic fiber filter tube prepared in example 3 are close to those of comparative example 1, and the gas permeability and the average flexural strength of the ceramic fiber filter tube prepared in example 3 are significantly higher than those of comparative example 1. It is demonstrated that freeze-drying on the green body and setting appropriate freeze-drying parameters (e.g., freezing duration, drying temperature, drying duration, etc.) can block the migration path of nanoparticles in the silica sol to the surface of the ceramic fiber filter tube due to capillary forces, so that the properties of the prepared ceramic fiber filter tube are more uniform, thus helping to maintain gas permeability and flexural strength.

Comparative Example 2

Firstly, the mullite short fibers were placed in water for stirring and dispersion, and then the excess water was filtered out and the filtered mullite short fibers were placed in an oven at 120° C. for drying to obtain well-dispersed short fibers (an aspect ratio of 100:1). Mullite short fibers, 30 wt % silica sol, and water were mixed in a mass ratio of 3:7:1 to obtain a mixed solution, and then glass fibers were added to the mixed solution, and the mass ratio of mullite short fibers to glass fibers was 4:1. Then, 10 wt % PVA solution was added to the mixed solution and stirred for 5 min to obtain a stirred mixed solution, and an addition amount of the PVA solution was 75% of the total mass of the mullite short fibers and glass fibers. The stirred mixed solution was quickly injected into the filter-pressing mold, and pressure was slowly applied to 3 MPa. After filtering out the water, the ceramic fiber filter tube green body was obtained. The demolded green body was placed in the refrigerator for freezing for 24 h, then dried in a vacuum lyophilizer of −40° C. for 12 h, and heated to 1200° C. in an air atmosphere at a rate of 2° C./min and held for 2 h, to obtain the ceramic fiber filter tube with an average pore diameter of 35.5 μm, a porosity of about 74.5%, a gas permeability of 688 $m^3 \cdot m^{-2} \cdot h^{-1} \cdot kPa^{-1}$, and an average flexural strength of about 2.07 MPa.

The steps for preparing the ceramic fiber filter tube in comparative example 2 are similar to those of example 3, with the difference being the ratio of the raw materials and the preparation process. The mass ratio of silica sol, mullite short fibers, and glass fibers in the film-making solution of comparative example 2 was 9.3:4:1, and the mullite short fibers and glass fibers were added in a sequential order; while the mass ratio of silica sol, mullite short fibers, and glass fibers in the film-making solution of example 3 was 40:4:1, and the mullite short fibers and glass fibers were added simultaneously. That is, the ratio of silica sol in the film-making solution of comparative example 3 is much larger than that in the film-making solution of example 2.

TABLE 3

Comparison of the performances of ceramic fiber filter tubes prepared in example 3 and comparative example 2

|  | Ceramic fiber filter tube prepared in example 3 | Ceramic fiber filter tube prepared in comparative example 2 |
| --- | --- | --- |
| Average pore diameter (μm) | 35.2 | 35.5 |
| Porosity (%) | 75 | 74.5 |
| Gas permeability ($m^3 \cdot m^{-2} \cdot h^{-1} \cdot kPa^{-1}$) | 787 | 688 |
| Average flexural strength (MPa) | 2.68 | 2.07 |

From Table 3, it is easy to see that the average pore diameter and the porosity of the ceramic fiber filter tube prepared in example 3 are closer to that of comparative example 2, and the gas permeability and the average flexural strength of the ceramic fiber filter tube prepared in example 3 are higher than that of comparative example 2. It is demonstrated that the correct and suitable mass ratio of silica sol, mullite short fibers, and glass fibers and a suitable preparation process are important for maintaining the gas permeability and the flexural strength of the ceramic fiber filter tube.

Comparative Example 3

The agglomerated mullite short fibers were placed into water for stirring and dispersing, and then the excess water was filtered out, and the filtered mullite short fibers were placed into the oven at 120° C. for drying, to obtain the well-dispersed short fibers (an aspect ratio of 100:1). Then, 30 wt % silica sol and water were mixed and stirred thoroughly to obtain a mixed solution, and a volume ratio of silica sol to water was 1:2.33. Mullite short fibers were then added to the mixed solution and the mass ratio of silica sol to mullite short fibers was 10:1, and 10 wt % PVA solution was added to the mixed solution and stirred for 5 min to obtained a stirred mixed solution, and an addition amount of the PVA solution was 75% of the mass of the mullite short fibers.

This stirred mixed solution was then quickly injected into the filter-pressing mold, and pressure was slowly applied to 3 MPa. After filtering out the water, the ceramic fiber filter tube green body was obtained. The demolded green body was placed in the refrigerator for freezing for 24 h, then dried in a vacuum lyophilizer of −40° C. for 12 h, and heated to 1200° C. in an air atmosphere at a rate of 2° C./min and held for 2 h, to obtain the ceramic fiber filter tube with an average pore diameter of 34.1 μm, a porosity of about 74%, a gas permeability of 606 $m^3 \cdot m^{-2} \cdot h^{-1} \cdot kPa^{-1}$, and an average flexural strength of about 1.12 MPa.

The steps for preparing the ceramic fiber filter tube in comparative example 3 are similar to those of example 3, with the difference being the ratio of the raw materials. No glass fiber was added to the film-making solution of comparative example 3; and glass fibers were added to the film-making solution of example 3.

TABLE 4

Comparison of the performances of ceramic fiber filter tubes prepared in example 3 and comparative example 3

| | Ceramic fiber filter tube prepared in example 3 | Ceramic fiber filter tube prepared in comparative example 3 |
|---|---|---|
| Average pore diameter (μm) | 35.2 | 34.1 |
| Porosity (%) | 75 | 74 |
| Gas permeability ($m^3 \cdot m^{-2} \cdot h^{-1} \cdot kPa^{-1}$) | 787 | 606 |
| Average flexural strength (MPa) | 2.68 | 1.12 |

From Table, it is easy to see that the average pore diameter an the porosity of the ceramic fiber filter tube prepared in example 3 are closer to that of comparative example 3, the gas permeability of the ceramic fiber filter tube prepared in example 3 is higher than that of comparative example 3, and the average flexural strength of the ceramic fiber filter tube prepared in example 3 is significantly higher than that of comparative example 3. It is demonstrated that adopting mullite short fibers and glass fibers together as the raw materials for preparing the ceramic fiber filter tube, as compared to the use of a single type of raw material, is more effective in maintaining the gas permeability and flexural strength of the ceramic fiber filter tube.

Comparative Example 4

The agglomerated mullite short fibers were placed into water for stirring and dispersing, and then the excess water was filtered out, and the filtered mullite short fibers placed into the oven at 120° C. for drying to obtain the well-dispersed short fibers (an aspect ratio of 100:1). Mullite short fibers, glass fibers, and water were mixed and stirred thoroughly to obtain a mixed solution, and the mass ratio of mullite short fibers, glass fibers, and water was 4:1:25. 10 wt % PVA solution was then added to the mixed solution and stirred for 5 min to obtain a stirred mixed solution, and an addition amount of the PVA solution was 75% of the total mass of the mullite short fibers and glass fibers. Then the stirred mixed solution was quickly injected into the filter-pressing mold, and pressure was slowly applied to 3 MPa. After filtering out the water, the ceramic fiber filter tube green body was obtained. The demolded green body was placed in the refrigerator for freezing for 24 h and then dried in a vacuum lyophilizer of −40° C. for 12 h, and heated to 1200° C. in an air atmosphere at a rate of 2° C./min and held for 2 h, to obtain the ceramic fiber filter tube with an average pore diameter of 36.5 μm, a porosity of about 75.4%, a gas permeability of 630 $m^3 \cdot m^{-2} \cdot h^{-1} \cdot kPa^{-1}$, and an average flexural strength of about 1.27 MPa.

The steps for preparing the ceramic fiber filter tube in comparative example 4 are similar to those of example 3, with the difference being the ratio of raw materials. No silica sol was added to the film-making solution of comparative example 4; and silica sol was added to the film-making solution of example 3.

TABLE 5

Comparison of the performances of ceramic fiber filter tubes prepared in example 3 and comparative example 4

| | Ceramic fiber filter tube prepared in example 3 | Ceramic fiber filter tube prepared in comparative example 4 |
|---|---|---|
| Average pore diameter (μm) | 35.2 | 36.5 |
| Porosity (%) | 75 | 75.4 |
| Gas permeability ($m^3 \cdot m^{-2} \cdot h^{-1} \cdot kPa^{-1}$) | 787 | 630 |
| Average flexural strength (MPa) | 2.68 | 1.27 |

From Table 5, it is easy to see that the average pore diameter and the porosity of the ceramic fiber filter tube prepared in example 3 is closer to that of comparative example 4, the gas permeability of the ceramic fiber filter tube prepared in example 3 is higher than that of comparative example 4, and the average flexural strength of the ceramic fiber filter tube prepared in example 3 is significantly higher than that of comparative example 4. It is demonstrated that the use of a combination of silica sol and PVA solution as a sintering aid for the preparation of ceramic fiber filter tube, as compared to the use of a single type of sintering aid, is more helpful in maintaining the gas permeability and flexural strength of the ceramic fiber filter tube.

Comparative Example 5

The agglomerated mullite short fibers were placed into water for stirring and dispersing, and then the excess water was filtered out and the filtered mullite short fibers were placed into the oven at 120° C. for drying, to obtain the well-dispersed short fibers (an aspect ratio of 300:1). Then, 15 wt % silica sol and water were mixed and stirred thoroughly to obtain a mixed solution, and a volume ratio of silica sol to water was 1:10. Mullite short fibers and glass fibers were then added to the mixed solution, and the mass ratio of silica sol, mullite short fibers, and glass fibers was 20:10:1. 10 wt % PVA solution was then added to the mixed solution and stirred for 5 min to obtain a stirred mixed solution, and an addition amount of the PVA solution was 75% of the total mass of the mullite short fibers and glass fibers. Then, the stirred mixed solution was quickly injected into the filter-pressing mold, and pressure was slowly applied to 3 MPa. After filtering out the water, the ceramic fiber filter tube green body was obtained. The demolded green body was then placed in the refrigerator for freezing for 24 h and dried in the vacuum lyophilizer of −40° C. for 12 h, and heated to 1200° C. in an air atmosphere at a rate of 2° C./min and held for 2 h, to obtain the ceramic fiber filter tube with an average pore diameter of 37.8 μm, a porosity of about 77.2%, a gas permeability of 632 $m^3 \cdot m^{-2} \cdot h^{-1} \cdot kPa^{-1}$, and an average flexural strength of about 1.45 MPa.

The steps for preparing the ceramic fiber filter tube in comparative example 5 are similar to those of example 3, with the difference being the aspect ratio of the mullite short fibers, the mass fraction of the silica sol, the volume ratio of the silica sol to the water, and the ratio of the film-making solution. The aspect ratio (300:1) of the mullite short fibers used in comparative example 5 was longer than that (100:1) of example 3, and the content of glass fibers in the film-making solution of comparative example 5 (the mass ratio of mullite short fibers to glass fibers being 10:1) was less than the content of glass fibers in example 3 (the mass ratio of mullite short fibers to glass fibers being 4:1).

TABLE 6

Comparison of the performances of the ceramic fiber filter tubes prepared in example 3 and comparative example 5

|  | Ceramic fiber filter tube prepared in example 3 | Ceramic fiber filter tube prepared in comparative example 5 |
|---|---|---|
| Average pore diameter (μm) | 35.2 | 37.8 |
| Porosity (%) | 75 | 77.2 |
| Gas permeability ($m^3 \cdot m^{-2} \cdot h^{-1} \cdot kPa^{-1}$) | 787 | 632 |
| Average flexural strength (MPa) | 2.68 | 1.45 |

From Table 6, it is easy to see that the average pore diameter an the porosity of the ceramic fiber filter tube prepared in example 3 are closer to that of comparative example 5, the gas permeability of the ceramic fiber filter tube prepared in example 3 is higher than that of comparative example 3, and the average flexural strength of the ceramic fiber filter tube prepared in example 3 is significantly higher than that of comparative example 5. It is demonstrated that a suitable aspect ratio of mullite short fibers and the ratio of the film-making solution is important for maintaining the gas permeability and the flexural strength of the ceramic fiber filter tube.

Comparative Example 6

The agglomerated mullite short fibers were placed into water for stirring and dispersing, and then the excess water filtered out and the filtered mullite short fibers were placed into the oven at 120° C. for drying, to obtain the well-dispersed short fibers (an aspect ratio of 30:1). Then, 50 wt % silica sol and water were mixed and stirred thoroughly to obtain a mixed solution, and a volume ratio of silica sol and water was 1:1. Mullite short fibers and glass fibers were then added to the mixed solution, and the mass ratio of silica sol, mullite short fibers, and glass fibers was 50:1:1. 10 wt % PVA solution was then added to the mixed solution and stirred for 5 min to obtain a stirred mixed solution, and an addition amount of the PVA solution was 75% of the total mass of the mullite short fibers and glass fibers. The stirred mixed solution was then quickly injected into the filter-pressing mold, and pressure was slowly applied to 3 MPa. After filtering out the water, the ceramic fiber filter tube green body was obtained. The demolded green body was placed in the refrigerator for freezing for 24 h and dried in the vacuum lyophilizer of −40° C. for 12 h, and heated to 1200° C. in an air atmosphere at a rate of 2° C./min and held for 2 h, to obtain the ceramic fiber filter tube with an average pore diameter of 31.2 μm, a porosity of about 73.4%, a gas permeability of 486 $m^3 \cdot m^{-2} \cdot h^{-1} \cdot kPa^{-1}$, and an average flexural strength of about 2.21 MPa.

The steps for preparing the ceramic fiber filter tube in comparative example 6 are similar to those of example 3, with the difference being the aspect ratio of mullite short fibers, the mass fraction of silica sol, the volume ratio of silica sol to water, and the proportion of film-making solution is different. The aspect ratio (30:1) of the mullite short fibers used in comparative example 6 was shorter than that (100:1) of example 3, and the content of glass fibers in the film-making solution of comparative example 5 was higher than that of example 3.

TABLE 7

Comparison of the performances of the ceramic fiber filter tubes prepared in example 3 and comparative example 6

|  | Ceramic fiber filter tube prepared in example 3 | Ceramic fiber filter tube prepared in comparative example 6 |
|---|---|---|
| Average pore diameter (μm) | 35.2 | 31.2 |
| Porosity (%) | 75 | 73.4 |
| Gas permeability ($m^3 \cdot m^{-2} \cdot h^{-1} \cdot kPa^{-1}$) | 787 | 486 |
| Average flexural strength (MPa) | 2.68 | 2.21 |

From Table 7, it is easy to see that the porosity of the ceramic fiber filter tube prepared in example 3 is relatively close to that of comparative example 6, the average pore diameter of the ceramic fiber filter tube prepared in example 3 is slightly increased compared to that of comparative example 6, the gas permeability of the ceramic fiber filter tube prepared in example 3 is significantly higher than that of comparative example 6, and the average flexural strength of the ceramic fiber filter tube prepared in example 3 is higher than that of comparative example 6. It is demonstrated that a suitable aspect ratio of the mullite short fibers and the ratio of the film-making solution are important for maintaining the gas permeability and flexural strength of the ceramic fiber filter tube.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for preparing a ceramic fiber filter tube with an air permeability, wherein the method comprises: mixing silica sol with water to obtain a mixed solution, and adding mullite fibers and glass fibers into the mixed solution; wherein a mass ratio of the silica sol, the mullite fibers, and the glass fibers is (30-45):(1.5-9):1, adding an organic forming aid into the mixed solution and stirring, and obtaining a ceramic fiber filter tube green body by a filter-pressing forming process; wherein an aspect ratio of the mullite fibers is within a range of (50:1)-(200:1); and placing a demolded green body in a refrigerator for freezing for 12 h-24 h, drying a frozen green body at a temperature of (−60° C.)–(−20° C.) for 12 h-24 h, and obtaining the ceramic fiber filter tube by a calcination process, wherein the calcination process includes calcining the frozen green body at a temperature of 800° C.-1400° C., and holding for 1 h-3 h, wherein a heating rate and a cooling rate are controlled at 0.5° C./min-3° C./min.

2. The method of claim 1, wherein a mass fraction of the silica sol is within a range of 20 wt %-40 wt %, and a volume ratio of the silica sol to the water is 1:(1.5-9).

3. The method of claim 1, wherein the organic forming aid is an aqueous polyvinyl alcohol (PVA) solution that has a concentration of 8 wt %-12 wt %, and adding an amount of the PVA solution that is 60%-80% of a total mass of the mullite short fibers and the glass fibers to the mixed solution.

4. The method of claim 1, wherein a time of the stirring is within a range of 3 min-10 min.

5. The method of claim 1, wherein a pressure in the filter-pressing forming process is within a range of 2 MPa-4 MPa.

* * * * *